M. KLEIN.
PRESSURE CONTROL FOR SUBMARINE CHAMBERS.
APPLICATION FILED FEB. 8, 1913.

1,131,712.  Patented Mar. 16, 1915.
3 SHEETS—SHEET 1.

Witnesses:
B. Dommers
E. Leckert

Inventor
Marcell Klein
By Henry Orth Jr.
Atty.

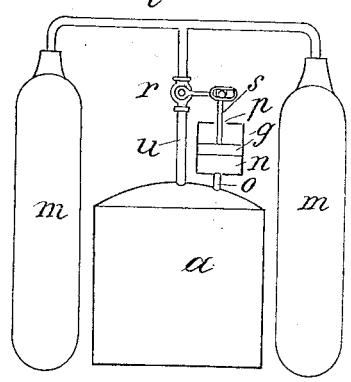
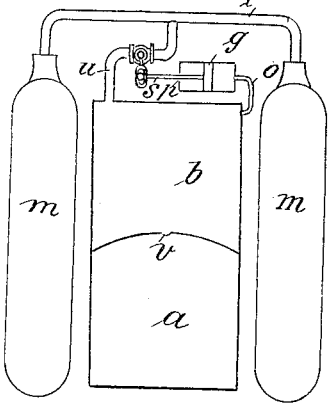
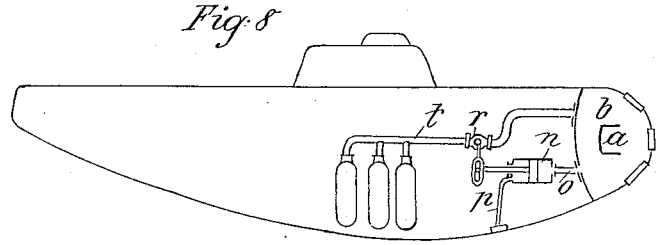
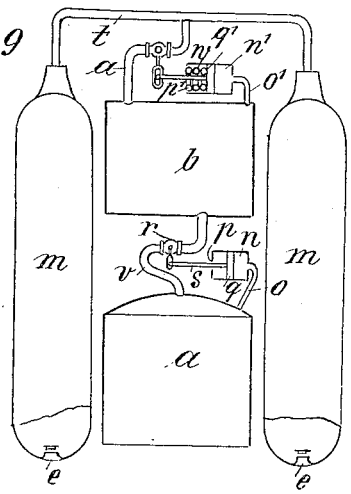

M. KLEIN.
PRESSURE CONTROL FOR SUBMARINE CHAMBERS.
APPLICATION FILED FEB. 8, 1913.
1,131,712.
Patented Mar. 16, 1915.
3 SHEETS—SHEET 3.
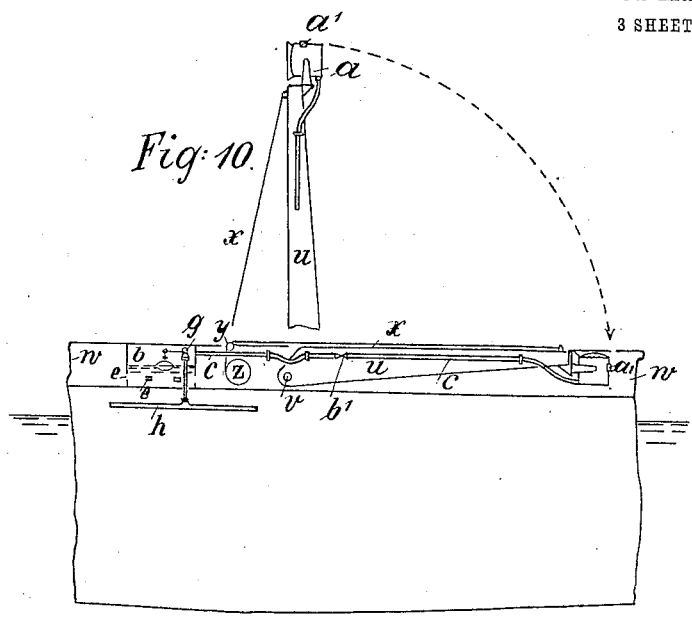
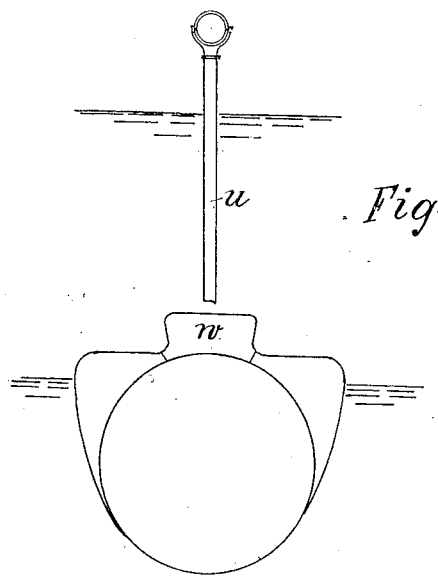
Witnesses:
B. Dommers
E. Leckert.
Inventor.
Marcell Klein,
By Henry Ith
Atty

UNITED STATES PATENT OFFICE.

MARCELL KLEIN, OF BERLIN, GERMANY.

PRESSURE CONTROL FOR SUBMARINE CHAMBERS.

1,131,712.      Specification of Letters Patent.      Patented Mar. 16, 1915.

Application filed February 8, 1913. Serial No. 747,145.

*To all whom it may concern:*

Be it known that I, MARCELL KLEIN, a subject of the Emperor of Austria-Hungary, residing at the city of Berlin, in the Kingdom of Prussia, German Empire, have invented certain new and useful Improvements in Pressure Control for Submarine Chambers, of which the following is a specification.

The object of the present invention is to render the glass lens, through which the light of a submarine searchlight radiates, and also the bracing of such searchlight or similar apparatus, which are to be sunk to great depths into the water, proof against the pressure of the water, so that it will be possible to lower such apparatus of a very light construction to the greatest depths, without their being injured by the high pressure existing at such depths. This object is obtained by the air or gas contained within the respective apparatus being kept at a pressure equal to that of the water on the outside, so that the walls of the casing are relieved. This uniformity of the pressure may, according to the present invention be obtained either by the air within the apparatus being brought into direct communication with the water without, so that it will be compressed to correspond with the water pressure without; or, the air space within the apparatus is connected to a high pressure pipe, through which air will flow into the apparatus in case the pressure within is lower, or air may escape from the apparatus in case the pressure is higher within.

In the accompanying drawing the invention has been exemplified, as embodied in submarine searchlights.

Figure 1:
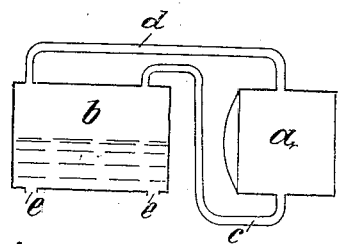
Figure 2:
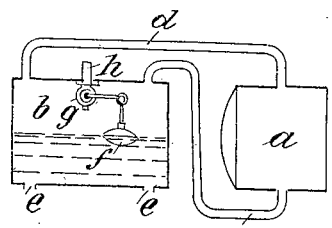
Figure 3:
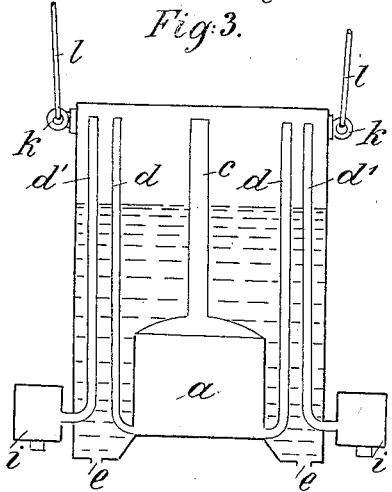
Figure 4:
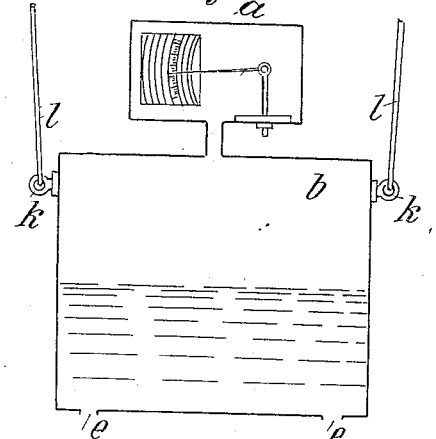
Figure 5:
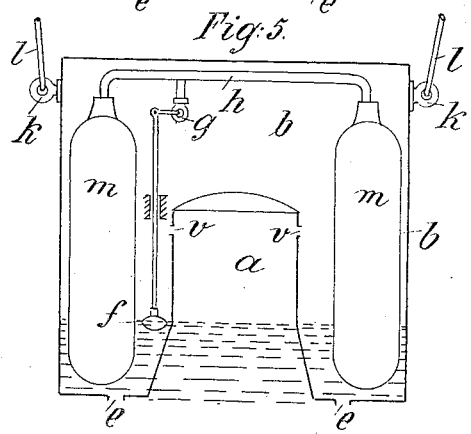

Figure 1 is a diagrammatic sectional view of one form of pressure device. Fig. 2 is a like view of a modification. Fig. 3 is a sectional view of the device in connection with a search-light and photographic camera. Fig. 4 is a sectional view of a pressure tank connected to a self recording thermometer. Fig. 5 is a sectional view of a pressure tank provided with supplemental pressure producing means within the tank. Fig. 6 is a side view partly in section of a tank connected with exterior pressure tanks and provided with a hydrostatic regulating device. Fig. 7 is a modification of the latter. Fig. 8 is a diagrammatic view showing the invention applied to a submarine boat. Fig. 9 is a further modification of the device shown in Fig. 7, and Figs. 10 and 11 are side and end views respectively of a submarine boat with a modification of the search light shown in Fig. 8.

In the constructional form according to Fig. 1 the searchlight $a$ communicates by means of pipes $c$ and $d$ with an air vessel $b$. At its lowest part the air vessel $b$ has one or several openings $e$, $e$, which form a communication between the water without and the space within said vessel, when the plant is immersed. In such position the more water will enter through the openings $e$, the deeper the apparatus is sunk. For preventing the water from entering into the searchlight the pipes $c$ and $d$ must open into the vessel $b$ at its highest point and the volume of air within the vessel must be at such a ratio to the volume of air in the search light, that the volume of air in the vessel is at least $\frac{x}{10}$ times as large as that of the searchlight, if $x$ is the greatest depth to which the plant is intended to be sunk, given in meters. When the plant is sunk to very great depths the vessel is connected by means of an air tube to a pressure accumulator which is provided, say, on an accompanying ship (not shown), and an automatic device is provided, which will prevent the water level in the vessel $b$ rising beyond a given height.

In Fig. 2 such device is exemplified in form of a float $f$, which automatically opens the admission valve $g$ when the said float is lifted by the water entering into the vessel, and closes the valve as soon as the level of the water has fallen sufficiently in consequence of the entrance of air through the tube $h$.

Fig. 3 shows a searchlight for photographic, photometric and cinematographic work under water. The searchlight $a$ is placed within the tank $b$, which is lowered into the water by means of ropes $l$. One or two photographic cameras $i$, $i$ communicate by means of pipes $d'$ with the air space at the top of the vessel $b$; these cameras may be electrically operated from the accompanying ship.

Fig. 4 shows a self-recording deep-sea thermometer, the case of which communicates with the vessel $b$.

Fig. 5 shows a searchlight directed downward without any glass whatever. The searchlight *a* communicates through holes *v* with an air vessel *b*, which has holes *e*, so that the level of the water in the searchlight corresponds to that in the vessel. By means of a valve *g* a float *f* controls the entrance of air from a high pressure tube *h* into the vessel *b*, said tube being connected with high pressure accumulators or tanks *m, m*, located inside the vessel *b*.

Fig. 6 shows a searchlight in combination with a hydrostatic apparatus. The latter consists of a cylinder *n* with a piston *q* and holes *p*. The cylinder *n* communicates at *o* with the upper part of the searchlight tank *a;* the piston rod *s* operates the three way cock *r*, which is provided in the high pressure pipe *t* which is connected to high pressure tanks *m, m*, located outside the vessel *a*. The piston is under load on the one side by the pressure of the water without, and on the other side by the pressure of the air within. When the apparatus is lowered the water pressure on top of the piston *u* increases and moves the latter downward in the cylinder, turning the cock *r* to open communication between pipes *t* and *u*, thereby increasing the air pressure in the tank *a*. When the apparatus is moved up, the water pressure on top of the piston diminishes and the latter is raised in the cylinder by the air pressure in the tank thus closing the cock and shutting off communication between pipes *t* and *u*.

In order to prevent the compressed air from entering directly into the searchlight, a separate tank *b* is provided according to Fig. 7, said tank having an opening *v*.

Fig. 8 illustrates a submarine boat fitted with a searchlight, which is of the open type and arranged in the chamber *b* serving as air tank.

In the arrangement according to Fig. 9 an intermediate tank *b* is provided which may be closed by means of one hydrostatic device *n'* against the high pressure pipe and by means of another hydrostatic device *n* against the searchlight. The hydrostatic device *n* operates at the same pressure as the water without, while the second hydrostatic device *n'* operates at a pressure of the air in the tank *b* which pressure is higher than the pressure of the water and corresponds to the tension of the spring *w*. In consequence of such arrangement, air of the same pressure will enter into the search light at all depths.

When the plant is to be sunk to very great depths the accumulators *m* may be fitted with sea valves *e*, so as to avoid having to fill them with air compressed to an excessively high degree. These valves *e* are then made as non-return valves, which will be automatically opened by the pressure of the water without, when the latter reaches the pressure of the air within the accumulators.

Figs. 10 and 11 illustrate the arrangement of a searchlight on submarine vessels for military purposes. With such submarines the searchlight is generally used only while the boat is sailing on the surface of the water, as it is not possible, even with the most intense and powerful sources of light to penetrate the water farther than about 50 meters. With the types of searchlights hitherto used, it was necessary, before diving, to remove these from their position on the bridge and take them into the interior of the boat, on the one hand for preventing the searchlight from being exposed to an unnecessary pressure of the water, and on the other hand to avoid producing an unnecessary resistance while the boat is traveling under water. Besides the fact that such detaching and stowing away is very difficult in heavy seas and can hardly be carried out without great danger to the men, the time wasted in doing so will considerably reduce the readiness of the submarine boat to dive and disappear. These disadvantages are entirely obviated by the arrangement according to Figs. 10 and 11. Here the searchlight is fitted to a mast *u*, which is mounted on a pivot *v* and is so arranged in the superstructure *w* of the boat, which is not watertight, when in diving position, that it is flush with the deck plates of this superstructure and will thus not increase the water resistance.

When the searchlight is to be used, the mast *u* is raised, swinging on the pivot *v*, by means of a suitable gear operated from within the boat. In Fig. 10 this gear consists of the rope *x*, which runs over the sheave *y* to the winch *z*, which is operated from within the boat by a gearing (not shown in the drawing). In diving position the searchlight communicates through a pipe *c* with the air vessel *b*, the air volume of which is kept constant in the same manner as shown in Fig. 2 by means of a communication to the high pressure air pipe *h* of the boat, so that any leakage of air will be automatically compensated and on the other hand the weight of the submarine boat will remain the same at any depth owing to the constancy of the water level in the air vessel *b*.

When in raised position above water the searchlight is, in consideration of the necessary ventilation, made to communicate with the atmosphere by means of valves $a_1$. These valves are so arranged, that they will open automatically when the mast with the searchlight is raised, and will close automatically when the mast is lowered. For using the searchlight also when it is above water, and the air vessels below water—a position indicated in Fig. 11—the communication between the searchlight and the air vessel *b* must be interrupted. This is preferably done by means of a valve $b_1$ (Fig. 10)

provided in the connecting pipe, which valve will close automatically when the searchlight is raised, and open automatically when it is lowered.

I claim:

1. In a pressure control for submarine chambers, the combination of a chamber, and a vessel communicating on the one side with the chamber and on the other side with the sea, whereby water in the vessel maintains an air pressure in the chamber equal to the external water pressure.

2. In a pressure control for submarine chambers, the combination of a closed chamber, and a vessel communicating on the one side with the chamber, and on the other side with the sea, whereby water in the vessel maintains an air pressure in the chamber equal to the external water pressure.

3. In a pressure control for submarine chambers, the combination of a closed chamber, a vessel communicating on the one side with the chamber and on the other side with the sea, and means to supply pressure to said vessel to keep a constant volume of air therein.

4. In a pressure control for submarine chambers, the combination of a closed chamber, a vessel closed at its top and open to the sea at its lower end, and means to establish communication between the chamber and the top portion of the vessel.

5. The combination of a submarine having an open compartment on the exterior thereof with a searchlight, a mast movable into and out of the compartment and carrying the searchlight, a vessel within the submarine communicating on one side with the searchlight and on the other with the sea, and means to supply pressure to said vessel to keep a constant volume of air therein.

In testimony whereof I affix my signature in presence of two witnesses.

Dr. MARCELL KLEIN.

Witnesses:
Woldemar Haupt,
Henry Hasper.

Copies of this patent may be obtained for five cents each, by addressing the "Commissioner of Patents, Washington, D. C."